Figure 17:
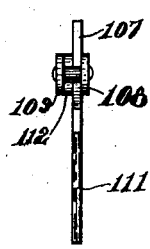
Figure 16:
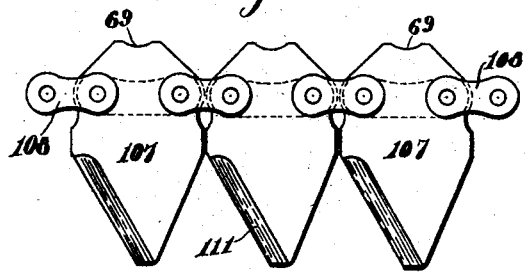
Figure 18:
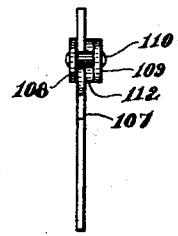
Figure 19:

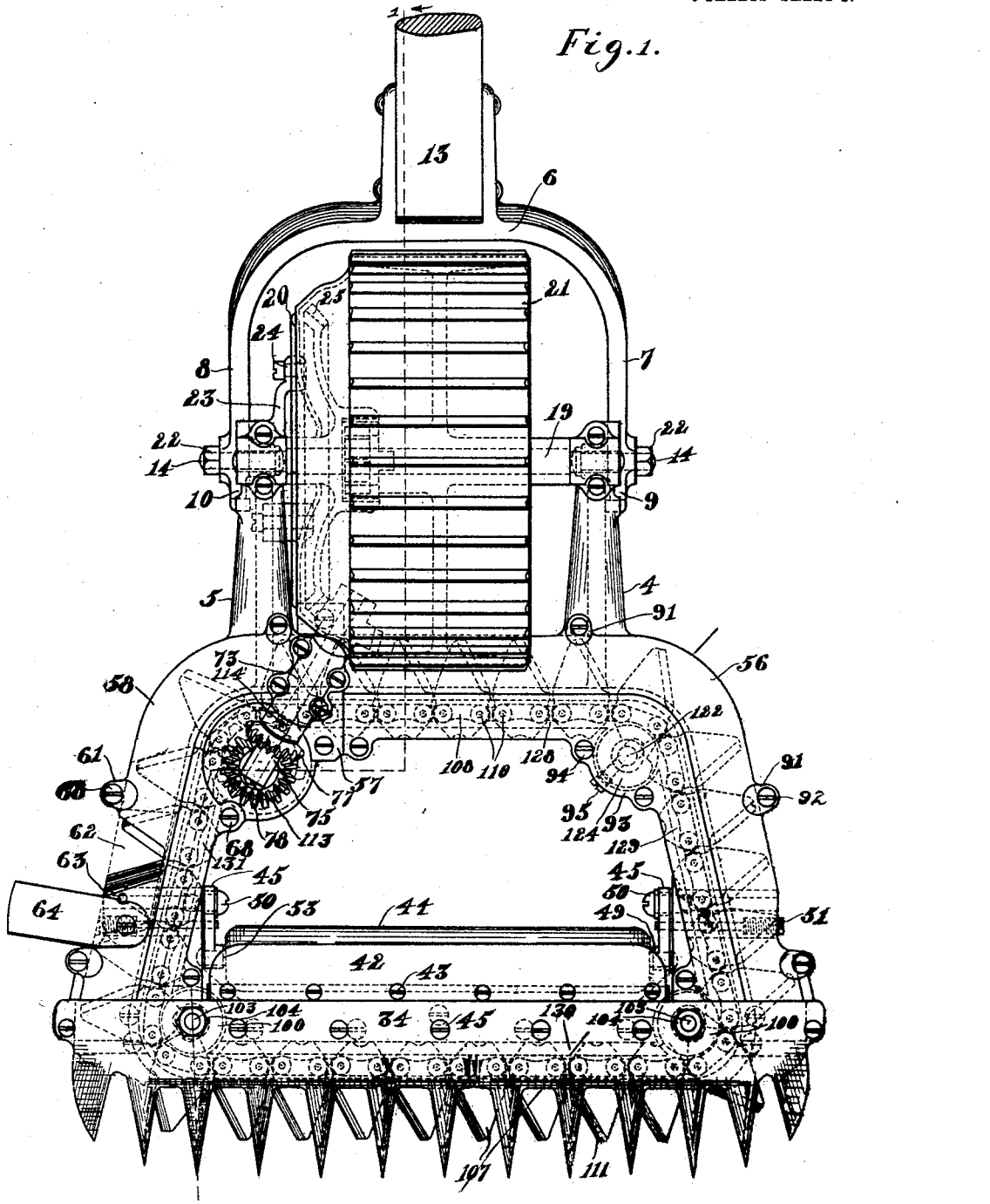

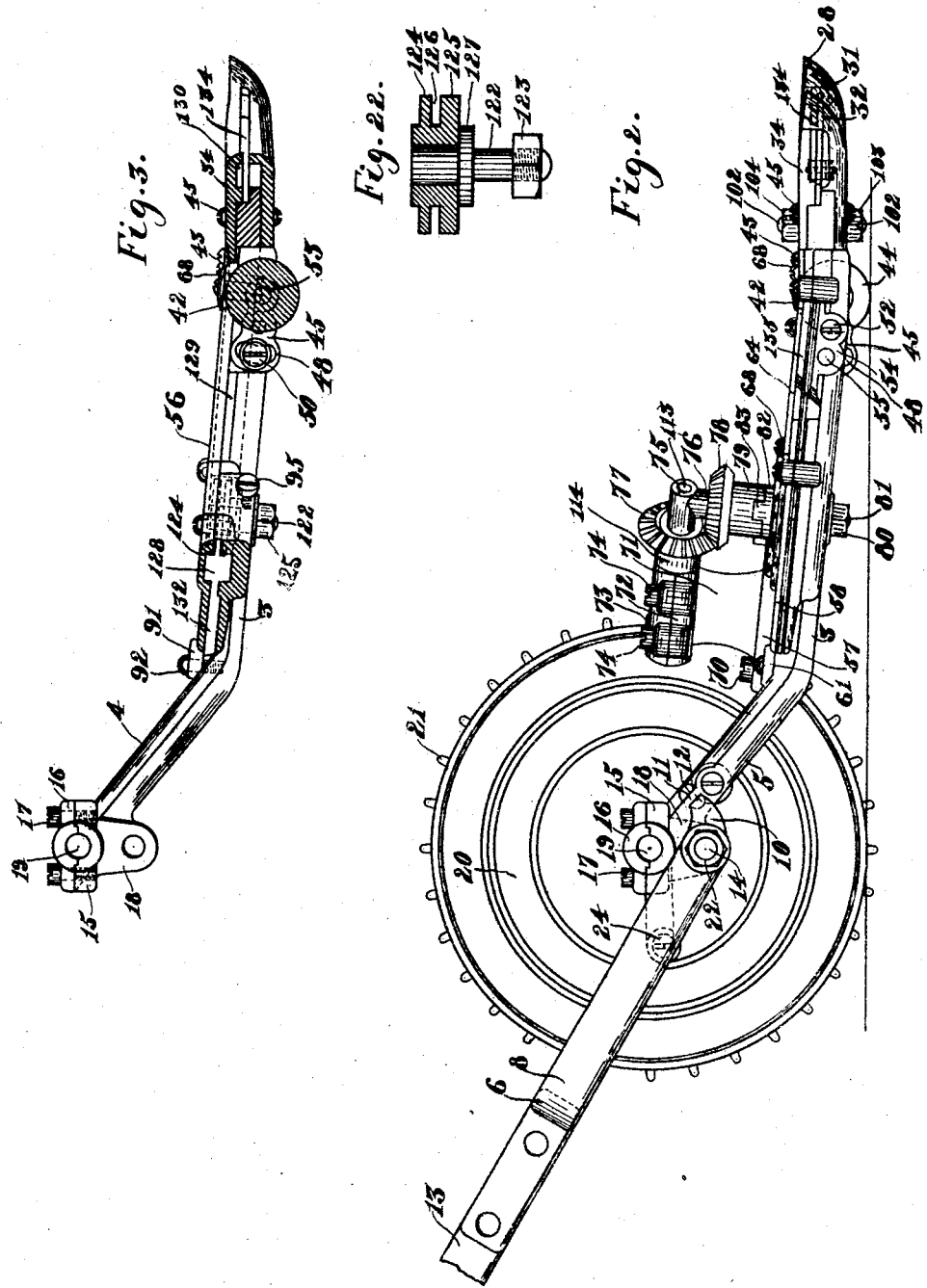

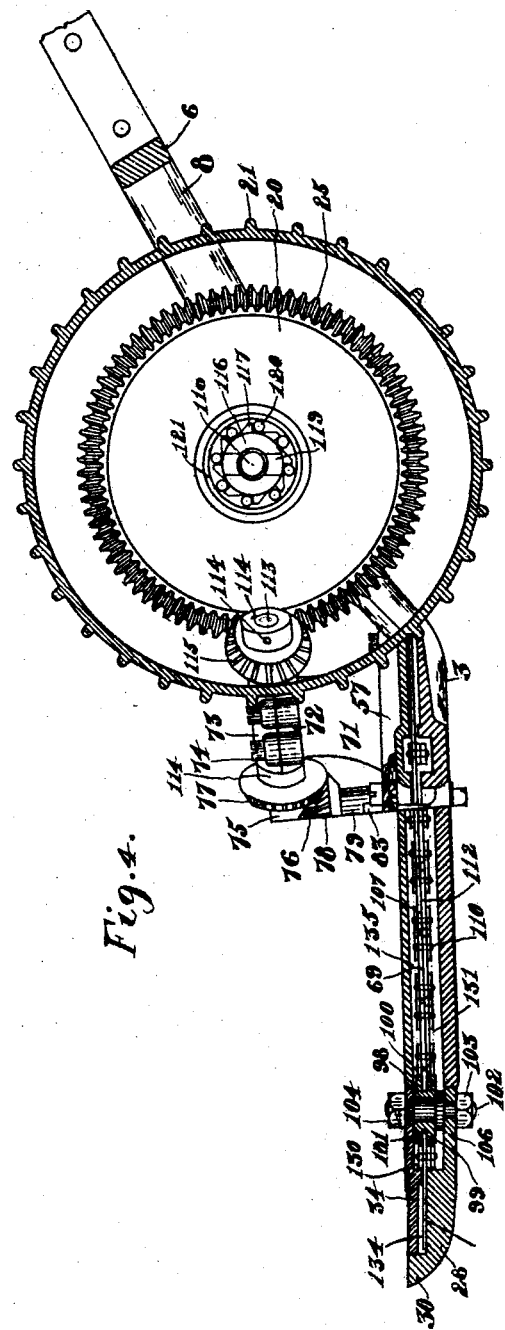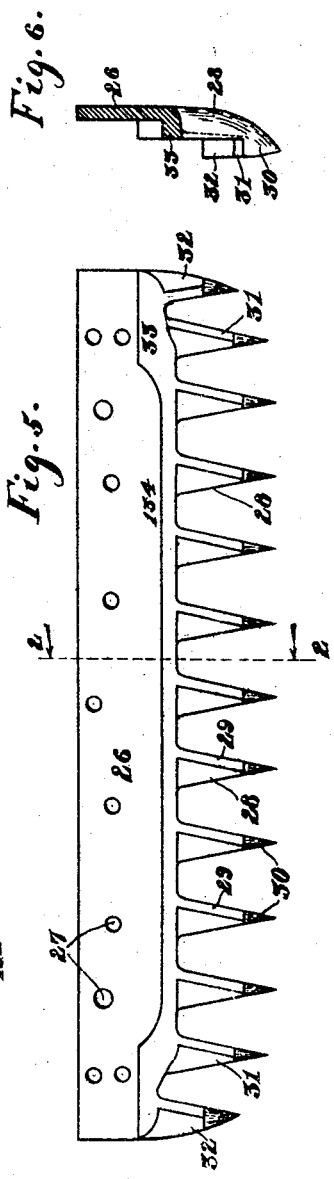

No. 765,126. PATENTED JULY 12, 1904.
O. R. CHAPLIN.
LAWN MOWER.
APPLICATION FILED FEB. 29, 1904.
NO MODEL. 5 SHEETS—SHEET 4.
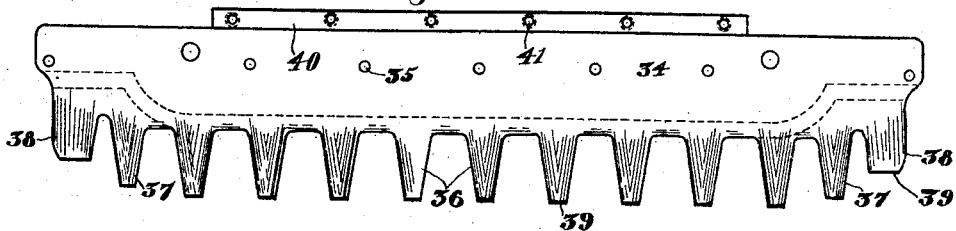
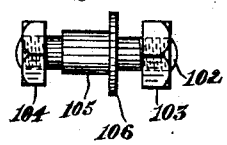
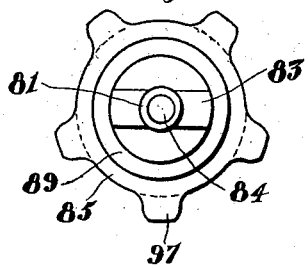
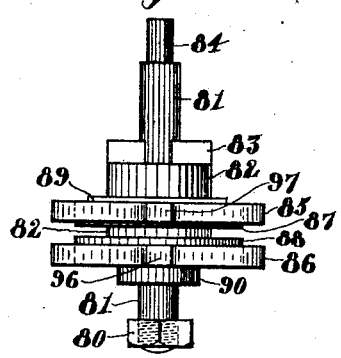
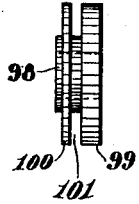
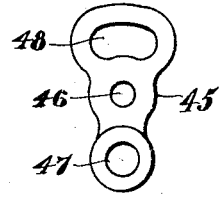
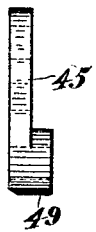
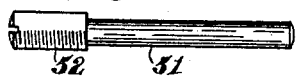
Witnesses:
Robert H. Dring
Robert W. Howard
Inventor:
Orril R. Chaplin,
by Charles F. A. Smith,
Atty.

No. 765,126. PATENTED JULY 12, 1904.
O. R. CHAPLIN.
LAWN MOWER.
APPLICATION FILED FEB. 29, 1904.
NO MODEL. 5 SHEETS—SHEET 5.

Witnesses:
Robert H. Dring.
Robert W. Howard.

Inventor:
Orril R. Chaplin,
by Charles F. A. Smith
Atty.

No. 765,126.

Patented July 12, 1904.

UNITED STATES PATENT OFFICE.

ORRIL R. CHAPLIN, OF BOSTON, MASSACHUSETTS, ASSIGNOR OF ONE-THIRD TO ROBERT W. HOWARD, OF BOSTON, MASSACHUSETTS.

LAWN-MOWER.

SPECIFICATION forming part of Letters Patent No. 765,126, dated July 12, 1904.

Application filed February 29, 1904. Serial No. 195,871. (No model.)

*To all whom it may concern:*

Be it known that I, ORRIL R. CHAPLIN, a citizen of the United States, residing at Boston, in the county of Suffolk and State of Massachusetts, have invented certain new and useful Improvements in Lawn-Mowers, of which the following is a specification, reference being had therein to the accompanying drawings.

My invention relates to certain improvements in mowers, and more particularly lawn-mowers; and it consists of a new and improved form of lawn-mower in which a revolving endless chain carrying a series of cutting-knives revolves around within a frame, the front portion of the frame being opened and the knives carried in contact with a series of sharpened cutter-fingers, and in this machine the rotary knives are dispensed with and the knives upon the chain continually carried in one direction as the machine is moved forward, and there is no backward movement of the chain or knives when the machine is drawn backward, neither is there at any time any reciprocation of the cutters in opposite directions, so that the cutters are only sharpened or beveled on one side.

This machine is particularly adapted for the cutting of high grass, as there is nothing above the cutters to prevent them from cutting any height of grass, and the supporting-roller, which is just back of the finger cutting-bar and is surrounded by the chain of knife-cutters, has lateral-adjustment movement, allowing the height from the ground of the cutting mechanism to be thus regulated, so that any desirable height of the standing cut grass can be obtained, and the knives carried by the chain will, if desired, cut the grass close to the ground, leaving the grass, for example, but one-half of an inch high.

The drive-wheel is in the rear of the cutting apparatus and is so arranged as to operate the drive-shafts only when the machine is being pushed ahead, and the machine is so arranged as to readily turn corners and can be used for cutting close to the walls, in circles around paths, trees, borders, flower-beds, shrubs, edging-walks, and in other places where hand-shears or a sickle are ordinarily used.

It consists also in certain improved adjusting and locking mechanism and in improvements to impart motion from the drive-wheel to the gearing mechanism and revolving chain within the frame and in improvements in the sprocket-wheel and pulleys whereby the chain and cutter-knives work easily with very little or no noise and in improvements in a knife-chain for making it strong and durable; and the object of the invention is to greatly promote simplicity, expedite the cutting or mowing action, lessen the cost of manufacture, and otherwise add to its utility, convenience, and facility of operation.

The stationary cutter-knife is attached to the forward portion of the frame, and the moving cutter-knives revolve within the frame in advance of the drive-wheel, so that the drive-wheel travels in only the cut grass and allows the cutter-knives to project out over the edge of the walk, so that the grass can be cut evenly without the use of hand-shears, as the supporting-roll and cutter-knives adjust themselves to the uneven surface of the lawn.

The invention consists in the combination of elements and in certain parts of construction entailed in the combination of said elements to obtain the desired result.

A full understanding of the invention can best be given by a detailed description of a preferred construction embodying the various features of the invention, and such a description will now be given in connection with the accompanying drawings, and I attain my object by the mechanism there illustrated, showing such preferred construction, and the features forming the invention will then be specifically pointed out in the claims.

Figure 20:
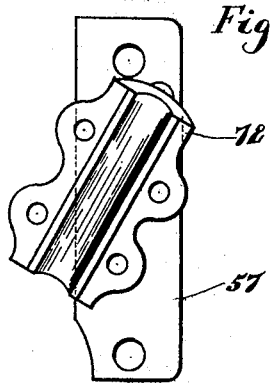
Figure 21:
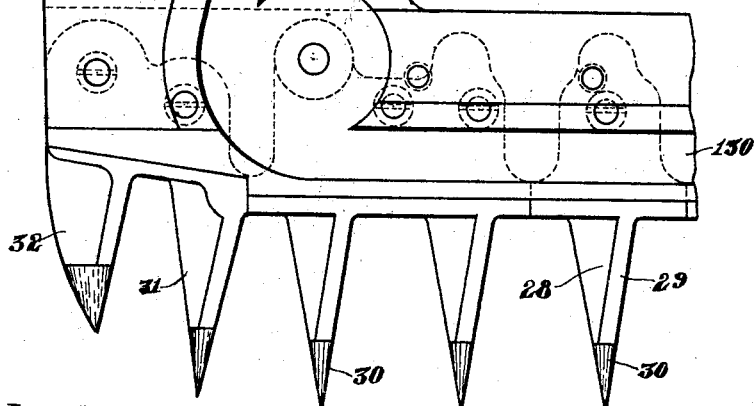

In said drawings, Figure 1 is a plan view of the apparatus, the handle-bar being broken away. Fig. 2 is a side elevation of the right side of the machine, (the side corresponding with the right side of the operator when pushing the machine,) also with the handle-bar broken away. Fig. 3 is a side view, partly in section, looking from the center of the machine toward the left side. Fig. 4 is a side view of the machine, partly in section, on the lines 1 1 of Fig. 1 looking toward the right side in the direction of the arrows. Fig. 5 is a plan view of the cutter-fingers and under finger-bar. Fig. 6 is a side elevation of same, partly in section, on the line 2 2 of Fig. 5. Fig. 7 is a plan view of the cover or upper finger-bar and top portion of the fingers which fits upon the piece of the apparatus which is shown in Fig. 5. Fig. 8 is a plan view of the cover which is attached to that portion of the machine-frame which carries the sprocket-wheel. Fig. 9 is a plan view of one of the sprocket-wheels. Fig. 10 is a view of one of the bolts and its locking-nut which are situated in each corner of the forward part of the framework. Fig. 11 is a side elevation of the sprocket-wheels, the vertical driving-shaft, and its contiguous parts. Fig. 12 is a view of a pulley or roller which fits upon the bolt or shaft shown in Fig. 10. Figs. 13, 14, and 15 are detailed views of the plate and pivoting-pin used in connection with the supporting-roller. Figs. 16, 17, 18, and 19 are views of parts of the endless chain and cutting-knives. Fig. 20 is a plan view of part of the framework and bearing for supporting part of the horizontal driving-shaft. Fig. 21 is a view illustrating a modification of part of the supporting-fingers. Fig. 22 is an elevation, partly in section, of the shaft and pulley or roller used in the left rear portion of the front part of the machine.

Latitude is allowed herein as to details, as they may be changed or varied at will without departing from the spirit of my invention and the same yet remain intact and be protected.

Corresponding and like parts are referred to in the following description and indicated in all the views of the drawings by the same reference characters.

The mowing-machine is of a new type in which a revolving chain carrying a series of cutter-knives takes the place of the old rotary cutting-reel or of reciprocating knives operating in opposite directions, which have been common in mowing-machines, and in carrying out my invention I provide a main frame which is preferably of one piece of cast metal, as it will be stronger and lighter than to have the parts bolted together, as the old machines are now. The main frame may be cast in any one of many shapes; but a frame which is nearly a right-angled parallelogram, such as is shown in the drawings, is preferable, the rear being narrower than the forward portion, the sides being inclined from the front toward the back and curved at the rear corners, and this frame or plate 3 is preferably cut away in the center to allow of cut grass passing through. This frame 3 has backward-extending parallel side arms 4 and 5, which may extend straight upward or may be curved or bent upward. The arm 4 has at its upper part a flange or plate 18, with a bearing portion 15, consisting of a semicircular recess, and attached to the portion 15 by screws 17 is a cover 16, with a semicircular recess in its under face coinciding with the lower recess and forming a bearing for the shaft 19. The arm 5 is also provided with a similar plate 18 and bearing-block 15 and cover 16 with the semicircular recesses, and the block and cover are attached by screws 17. On the right of the machine looking from the handle and on the same side as the gearing is a plate 23, attached by screws 24 to the disk 20.

A handle 13 is inserted in a forked casting 6, having the arms 7 and 8, which are pivoted on arbors 14, extending from the flanges 18 below the main journal-bearing of the shaft 19 and held thereon by nuts 22. Each of these arms 7 and 8 is provided with an upward-extending curved finger or offset 10, flattened at 11 to come in contact with the flattened portion 12 on the under side of the arms 4 and 5, so that the front portion of the machine may be lifted from nearly the center of the ground-wheel upward by pressure down upon the handle-bar, and if the handle is raised it comes in contact with the rear ends of the frame and will lift the wheel from the ground.

The main shaft 118 is journaled center crosswise between the frame or the rear portions of the rear extending arms 4 and 5 and carries the transporting or main drive-wheel 21, located in the center between these arms 4 and 5. This drive-wheel has a hub 19, running loose on the main shaft 118 and drives by means of the roller friction-clutch, as shown in Figs. 1 and 4 of the drawings, the large beveled gear 25 made fast on this same shaft 118. This roller friction-clutch consists of a wheel 116, having a series of ratchet-shaped teeth 117 formed upon its periphery. Surrounding said ratchet is a metal ring 121, and placed within said ring and between each ratchet-tooth is a small steel roller 120, adapted to just fill the inner side of the wheel and ring, causing friction in going forward. On the outside end of this ratchet-wheel is the projecting lug 119, which engages or fits into the narrow slot on the hub of the drive-wheel, and it will thus be seen that as the machine is pushed forward motion is imparted to the gearing and likewise to the movable cutters; but as the machine is moved backward it will not cause the cutters to operate. This driving beveled gear 25 meshes into a pinion 115, placed on a driving-shaft 113, which is preferably a short horizontal shaft journaled in a bearing 72 on the top of an upright flange or plate 71, which is attached to a small cover-plate 57, as shown in Figs. 2, 4, and 20, this cover-plate 57 being part of the cover of the main frame 3. The bearing 72 has a cover 73 attached to it by screws 74, and this horizontal shaft and bearing are situated on the rear right portion of the front part of the main frame 3.

The short horizontal driving-shaft 113, immediately forward of the ground-wheel and above the rear right corner of the main frame 3, has a miter-gear 77, and this miter-gear 77 meshes with the miter-gear 78 of a short vertical driving-shaft or upright stud-pin 81. The horizontal driving-shaft 113 runs out diagonally from the driving or ground wheel at an angle of about sixty degrees, more or less. The miter-gear 78 turns the shaft 81 and the endless cutter-chain and movable knives 107. The short vertical shaft or stud-pin 81 has a box-cover 76 above the beveled gear 78, inclosing the upper portion of this shaft, and this cover 76 is spliced to the cover 75 of the horizontal shaft 113, as shown in Fig. 2.

A short piece 58 of the main-frame cover, as shown at Figs. 1 and 8 of the drawings, is provided with screw-holes 67, in outward-extending flanges 61, by which it is attached by screws to the main frame, and is provided with a boss on one side, the boss being provided with a slot 60 and a circular runway 59 for the upper portion of one of the sprockets. From this cover 58 extends an upright stand or circular casing 82, having projections 83 for inserting in slots in the upper circular casing 79, which casings 79 and 82 are adapted to cover the revolving vertical driving-shaft below the beveled gear 78 and above the cover 58.

To sharpen the cutter-knives while in the machine, the cover 58 is provided with an opening or notch 62, corresponding to the angle of the cutters and having a beveled side 63, which beveled side is on the same incline as the incline of the beveled side 111 of one of the movable cutter-knives 107 on the endless chain, is ground or sharpened to, and the frame 3 is also notched below the notch 62 to correspond with it. Immediately forward of this beveled side is a hole 65, extending through the cover 58 and frame 3, for receiving a locking-pin, which pin is adapted to fit over the blunt inclined side of one of the cutting-knives 107 when the knife is moved a trifle in advance of the beveled edge on the side of the frame, so that the chain and knives are held from backward movement while the knife 107, whose beveled edge 111 projects within the opening 62, is being sharpened.

Immediately forward of the hole 65 is pivoted, as at 66, a cover-plate or lid 64 and a cover 58, and this lid 64 is adapted to swing round to cover the notch 62 when the knives are not being sharpened and the machine is in use. The pin, which extends through the hole 65 and against the chain, will also serve as a locking device for preventing the continuous revolving of the chain.

The vertical driving-shaft 81 has a nut 80 for preventing its upward movement, and upon this shaft and within the frame and cover are the two sprocket-wheels 85 and 86, the upper sprocket-wheel 85 being provided with teeth 97 for projecting between the links 108 of the endless chain, and the lower sprocket 86 is provided with teeth 96 to extend between the links 109 of the same chain, and these sprockets are adapted to move the chain in a horizontal plane in a runway situated between the frame 3 and the cover-pieces. Below the sprocket 66 is a bearing-plate 90, and above the sprocket 85 is a small bearing-plate 89. Between these two sprockets are the bearing-plates 87 and 88, having a space between for receiving the arc end 69 of the cutter-knives 107 as the knives are revolved with the chain around the sprocket.

The sprockets 85 and 86 are provided with a hub 82, having the upward-extending flanges 83 to fit in slots of the beveled gear 78, so that as this beveled gear is turned by the beveled gear 77 the sprocket-wheels are turned, thus turning the chain, and the arc end of the knives turn upon the hub 82 between the bearings 87 and 88 as that portion of the chain passes on the sprocket-wheels.

The endless chain consists of a series of knives 107, and these forward of the chain are V-shaped, with the beveled edge 111 on the side in the direction in which the chain is going. Rearward of the chain the sides of the knives are slanting, forming at their rear arcs 69 for revolving around the rollers and hub of the vertical driving-shaft, and these knives 107 alternate with the links 108, each knife taking the place of a chain-link. The links 109 correspond with the links 108, but are situated on the under side of the knives and below the strength-plate 112, attached to the knife. This strength-plate 112 extends across the under side of each knife and is screwed thereto for the purpose of strengthening the knives, so that the knife portion 107, with its strengthening-piece 112, is as strong as the combined links 108 and 109, and this same link 112 under the cutter serves as a guide to keep the cutters on a straight line when passing along the guide groove or recess in the plate. At the extreme rear end of the cutters the knife projects out a little from the links, as hereinbefore explained, and slides in a groove between the rib on the upper cover and a groove on the lower frame, thus keeping the front end and edge of the cutting-knife in contact with the cutting edge of the fingers to make a shear cut. These links, combined with the knife, form a chain which will stand great wear and tear, and these two links 108 and 109, together with the knife 107 and the strengthening-plate 112, are provided with the steel pivot-pin 110, which passes through the four thicknesses and rivets them together, so that the chain can revolve around the rollers and sprocket-wheels. This combined endless chain and cutters travels in one direction, and to produce a shear cut with the knives the front edge 111 of the plate is cut on an angle to the chain, and this edge is beveled from the top side down to a knife or cutting edge and kept in contact with the cutting-fingers 28 by the rib on the front edge of the finger-bar cover pressing down onto the top surface of the moving knives and the rear end of the knives sliding in a groove between the cover and frame to keep the knives in cutting contact with the fingers, as in a pair of shears.

The endless chain passes from the sprocket-wheels on the upright driving-shaft around the rear portion of the main frame 3 and around a roller or pulley running on a stud-pin 122, which stud-pin 122 is situated in a boss portion extending outward from the inner left portion of the main frame 3, and this stud-pin 122 has a flange portion 127, by which it rests upon the upper portion of the frame 3 and is screwed to the frame by the nut 123 upon its lower end. This stud-pin 122 carries a roller which is provided with an annular groove 126 between the roller porions 124 and 125, which groove is adapted to receive the arc ends of the knives as the links are revolved around the roller portions 124 and 125, and from this roller the chain moves forward through the left side of the frame 3 around a roller 98, which is situated in the left front end of the frame 3. This roller 98 rests upon a flange 106 of a hub 105, which hub is a raised portion of the stud pin or shaft 102, which extends through the frame 3 and finger-bar plate and cover and is provided at its lower end with a locking-nut 103, and on its upper end a similar locking-nut 104, which locks over the finger-bar cover 34. From this roller the chain passes along the front of the machine, the knives extending through the opening and making with their beveled edges in contact with the beveled edges of the fingers a shear cut and then passing around a small roller on the forward right end of the frame 3, and from thence the chain passes toward the back of the machine on the right side of the frame and again around the sprocket-wheels.

The cover 56 on the left rear side of the frame 3 has the projection 93 for covering the roller 124 and is attached to the frame 3 by the screws 94. The roller in this corner is used as a locking or adjusting roller for adjusting the chain, and the frame 3 is provided with an opening for receiving the adjusting-screw 95, which works against the stud-pin 122 and tightens or slackens the chain, as desired. In order to permit the stud-pin 122 to move, the nut 123 must be unloosened. Screw 95 is then turned sufficiently and then nut 123 tightened. (See Figs. 1 and 3.)

At the front end of the frame 3 is bolted or screwed the finger-bar plate 26, which extends partly underneath the frame and is provided with the screw-holes 27 for receiving the fastening-screws, and also the finger-bar cover 34 is fastened by screws 43 extending through its screw-holes 35 to the upper side of the frame 3.

The finger-bar plate 26 is provided with a rib 33, extending along its forward portion, with a guide 134 forming part of the runway for the links 109 of the cutter-chain, and the rib 33 is provided with forward-extending V-shaped fingers 28, having a beveled edge 29 on their left side, which is the side which first comes in contact with the cutting-knives attached to the chain or belt; but, if desired, the chain can be arranged, as is readily understood, to move in the opposite direction, from right to left, in which case the beveled edge of the knives would be on the corresponding opposite side from what is shown and the beveled edge of the fingers would be on the right side instead of the left. The fingers 28 terminating in a V-shaped point, but having at their outer portions a raised boss 30, and fingers 31, which are the next to the last fingers from each end, preferably do not extend quite so far forward as the other fingers 28, and the last finger 32 on each end is provided with a cam-shaped back and is shorter than the others, as is clearly shown in Fig. 5 of the drawings.

The finger-bar cover 34 has a series of forward-extending V-shaped fingers 36 with their points squared off, as at 39, to fit into the boss ends of the fingers 28, the fingers 37 on each side being a trifle less in length to correspond with the fingers 31 and the fingers 38 having a cam-shaped back and being of shorter length to correspond with the fingers 32, and this finger-bar cover is provided with a flange 40, having screw-holes 41 for receiving screws 43 and fastening thereto the cover or wing 42 for the supporting-roller 44. (See Figs. 1, 2, and 3.)

The supporting-roller 44, which is immediately back of the forward portion of the framework 3, runs in the opening between the side portions of the frame 3 and supports the forward part of the machine and has adjusting means for regulating the height from the ground at which the cutters will shear the grass. This roller 44 is journaled at each end into one end of two horizontal levers, one on each side of the roll. The centers of these levers are pivoted to the frame, and at the other end there is a curved slot for a bolt 50 to pass through and tap into the frame for an adjustment of the roller to raise or lower the cutters from the ground, and the bolt clamps the lever fast to the frame.

As shown in the drawings, the cutting-finger guard is made in connection with the finger bar or plate in one piece; but a modification of this is shown in Fig. 21. In this modification the cutting-finger guards are attached to the frame singly, and in this case the finger-bar plate or flange is cast to or made a part of the front end of the frame, as shown in Fig. 21, and extending forward and the front edge turned up in the form of a rib to a height to meet the cutters on the under side. The cutter-finger guards are made single, as shown in this drawing, and each bolted or screwed to the under side of the plate or frame.

The main frame 3 is provided with covers 56, 57, and 58. The cover 56 fits over the left and rear portions of the frame and is provided with projections 91, having holes for the insertion of the screws 92, by which this cover 56 is attached to the frame 3. The cover portion 57 is inserted in the rear of the frame between the cover portion 56 and 58, and the cover portions 57 and 58 are attached as hereinbefore described.

Within the frame is the guide or runway 128, 129, 130, and 131, which makes a continuous runway within and around the four sides of the frame 3 and in which the link portion of the cutter-chain moves. Extending outward from this runway is the guideway 132, 133, 134, and 135, in which passes the V-shaped portion of the cutter-knives.

Having thus described my invention, I claim as new and desire to secure by Letters Patent—

1. In a mowing-machine having a frame, an endless chain of cutting-knives, a groove in the frame for sharpening the knives and a lid pivotally attached to the frame for covering the groove, substantially as shown and described.

2. A mowing-machine provided with a frame and having an endless chain of knives, a series of fingers, a pair of plates inside the frame and behind the fingers, a roller within the frame, a guard attached to the forward part of the frame and extending rearward above the forward and upper part of the roller, trunnions on the roller journaled in the plates, pins inserted through the frame and plates for pivoting the plates, slots in the plates and clamping-screws for adjusting the plates and roller, whereby the roller will be effective in assisting in the cutting movement of the mower, as specified.

3. In a lawn-mower, a frame, an endless chain of cutters within the frame, and a notch in the frame corresponding to the angle of the cutters and beveled to the same angle as the cutters, substantially as shown and described.

4. In a lawn-mower a cutting-knife and the frame provided with a notch having one of its sides beveled and at the same angle as the cutting-knife.

5. In a lawn-mower the frame provided with a notch having a beveled side extending nearly diagonally across one of the sides of the frame and an opening in the frame forward of the notch for receiving a locking-pin.

6. In a lawn-mower an endless chain of horizontal cutting-knives and the frame provided with a notch and a pivoted cover for closing the notch and shutting from view the cutting-knife within the notch.

7. A mowing-machine having a four-cornered framework provided with a center opening, pulleys arranged in three of the corners, a sprocket-wheel arranged in the fourth corner, a vertical shaft operating the sprocket-wheel, a guideway within the frame, a knife-belt, a slot in the frame, a screw within the slot operated from the center opening for adjusting one of the pulleys to tighten the belt, a driving-shaft extending diagonally across the rear of the framework, means connecting the vertical and driving shafts to turn the sprocket-wheel to operate the knife-belt within the guideway and around the sprocket-wheel and pulleys, substantially as shown.

8. In combination with an endless belt, means thereon for holding knives substantially as described, traveling wheels over which said belt travels and carries the knives in a horizontal plane, a ground-wheel in the rear of the belt, a driving-shaft extending diagonally forward from the ground-wheel and above the rear part of the frame and belt, means connecting the driving-shaft and ground-wheel, a vertical shaft, means connecting the vertical shaft and driving-shaft, and a pair of sprockets fast on the vertical shaft and operated on the interior of said belt and so adjusted in relation thereto as to operate said knives.

9. In a mowing-machine, a vertical shaft, means for operating the shaft, upper and lower sprockets carried by the shaft, the endless belt of upper and lower links engaged respectively by the upper and lower sprockets and having knife-sections thereon traveling between the sprockets.

10. In a lawn-mower a cutting-knife having a beveled side and the frame and its cover provided with a notch passing through the frame and cover and having one of its sides beveled diagonally and at the same angle as the cutting-knife.

In testimony whereof I affix my signature in presence of two witnesses.

ORRIL R. CHAPLIN.

Witnesses:
CHARLES F. A. SMITH,
MARTHA E. GOODING.